Jan. 17, 1939. O. P. LIVELY 2,144,459
MEANS FOR GRINDING WORMS
Filed Aug. 10, 1936 3 Sheets-Sheet 3
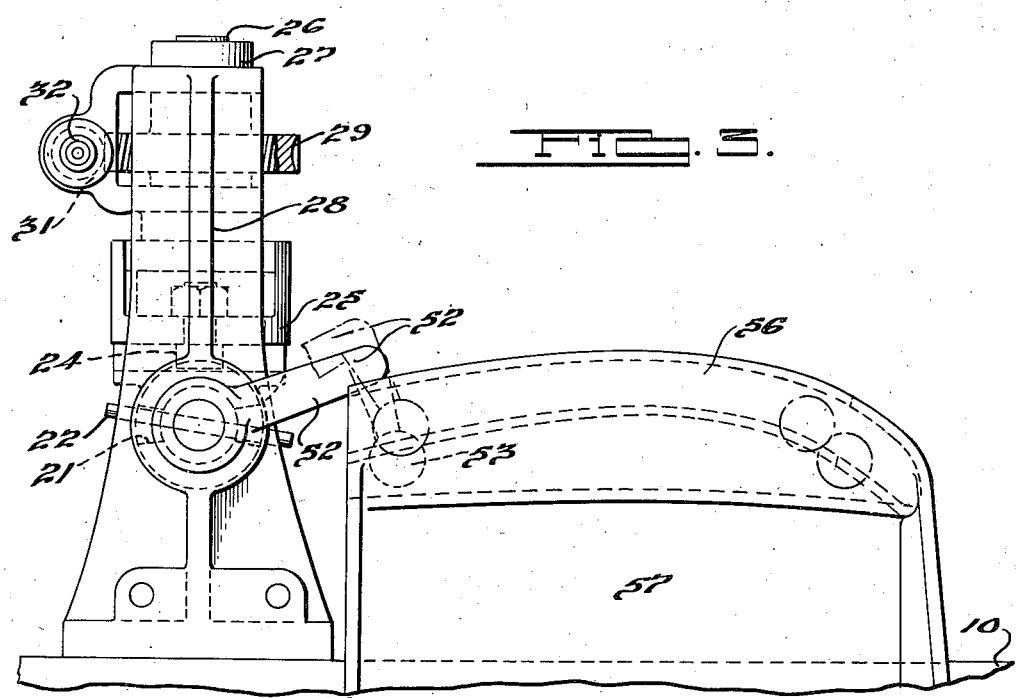
FIG. 3.
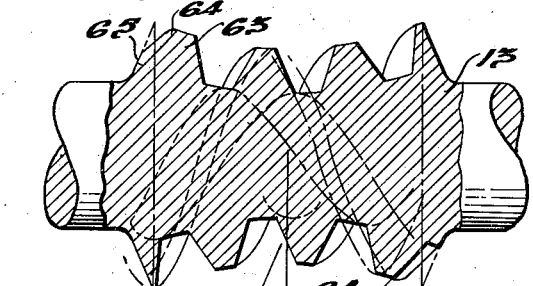
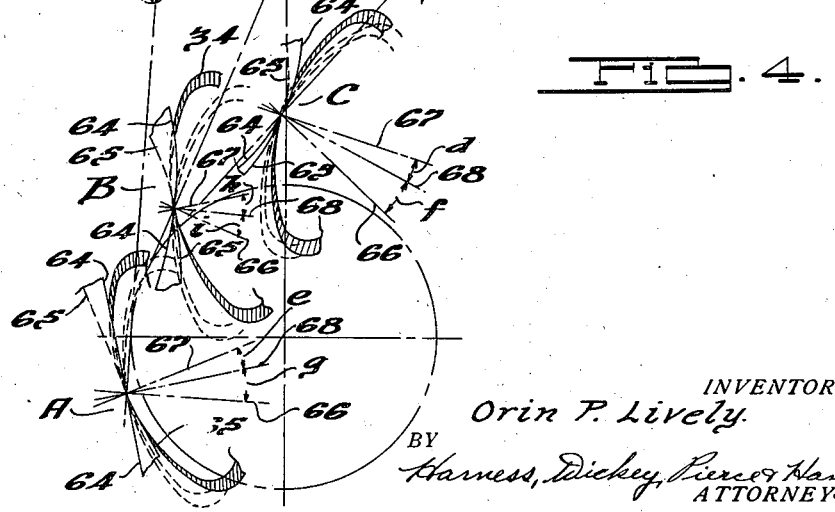
FIG. 4.
INVENTOR
Orin P. Lively.
BY
Harness, Dickey, Pierce & Hann.
ATTORNEYS.

Patented Jan. 17, 1939

2,144,459

UNITED STATES PATENT OFFICE 2,144,459

MEANS FOR GRINDING WORMS

Orin P. Lively, Portsmouth, Va., assignor to Cone Worm Gear Corporation, a corporation of Virginia Application August 10, 1936, Serial No. 95,061

5 Claims. (Cl. 51—33)

My invention relates to a method and means for grinding worm elements, and particularly to a method and means for grinding globoidal gears particularly of the "Hindley" type. In the patent to Cone, No. 1,885,686, issued November 1, 1932, covering the method and apparatus for cutting worm gearing, a detailed explanation is to be found relative to the difficulties and the solution of the problems in producing the Hindley type of worm. This embodies the machining of the worm thread on a line tangent to a circle concentric to the worm wheel when the center relation of the tool and gear is the same as that of the worm and worm wheel in service. This machining must occur in the central plane of the worm and must progress laterally thereacross after such center distance has been reached. In practice, a tool was employed having teeth which simulated the teeth of the worm wheel but which were narrower in width. The tool and the worm blank were moved toward each other during the cutting operation until the correct center distance was reached. A thread was generated in this manner of greater thickness than that desired and the groove between the thread was naturally of narrower width. When cutting the thread on the Hindley type of worm wheel during an "in-feed" movement, the thread flank would be deformed from that of the desired Hindley type. After the narrow teeth have been moved inwardly to cut the thread to depth, a side feeding operation is employed to widen the gap and to correct the form on the flank. The machining due to the side movement occurs in the plane of the worm and on a line tangent to the concentric or "base" circle above referred to. With this process an accurate worm of the Hindley type can be formed.

The present invention contemplates the grinding of the surface of the thread after a hardening operation. The same problem presents itself in this operation as occurred in generating the worm. Various elements must be taken into consideration. The helix angle of the thread will vary at each change in radial distance of the thread from the central axis of the worm. Two factors, therefore, enter into the change of helix angle of the thread. The first change is due to the depth of teeth. Each point in the depth being at a different radius from the center of the worm will have a different helix angle. The second change occurs due to the "hour glass" type of the worm which changes the radial distance of the thread itself throughout the length of the worm.

The present invention contemplates the use of a grinding wheel which is sufficiently large to produce a desirable grinding operation, while eliminating interference with other portions of the thread, employed in combination with mechanism which compensates for the change in helix both due to the depth of thread and the variation in radial distance of the thread from the axis of the worm. Only a thin line approaching a point of the grinding wheel is utilized for the grinding operation so that substantially a point contact is provided between the grinding wheel and the thread. This may be slightly greater in practice, but only a very narrow width approaching a point is utilized.

A cam surface tilts the grinding wheel in accordance with the change of radial distance of the thread as the grinding wheel passes across the worm and additionally tilts the grinding wheel as it is advanced in depth between the thread. The cam surface is employed to compensate for the change of helix for both the "hour glass" dispositions of the thread and for the depth of the thread by controlling automatically the position of the grinding wheel relative to the thread in all of its positions. It is only necessary, therefore, to reciprocate the wheel the depth of the worm thread as the wheel is advanced along the worm, to accurately grind the surface of the thread of the worm. It is to be understood that the table for supporting the grinding wheel in position relative to the worm and the support for the worm are driven in synchronism with each other so that, as the wheel passes across the face of the worm in the plane of the worm axis, the worm will turn to present a flank of a thread to the wheel. A simple, but positive and accurate device is provided in this manner for grinding the flank surfaces of the thread of the Hindley type of worm.

Accordingly, the main objects of my invention are: to provide a method and means for accurately grinding the thread of a globoidal worm having straight flank lines or sides when taken in a plane passing through the worm axis; to provide a method for accurately grinding the surface of the thread of a Hindley worm having one or a plurality of threads thereon; to provide a grinding wheel which tilts in accordance with the changing helix angles due to the depth of the thread; to provide a grinding wheel with means for effecting its tilting in accordance with the change in helix angle due to the varying radial distance of the thread on a worm of the hour glass type; to provide means for effecting the compound tilting of a grinding wheel to compensate for the change in helix due both to the depth of thread and the varying radial position of the thread on a worm of the globoidal type; to employ a substantial point engagement between the grinding wheel and a thread of a Hindley worm in the plane of the axis of the worm; to move the point engagement between the grinding wheel and the worm thread across the worm as the wheel is reciprocated the depth of the thread while the worm and tool are operated in synchronism and compensate during the grinding operation for the change in helix of the thread due to the depth of thread and its varying radial position on the worm; and in general, to provide a method and means for accurately grinding the surface of a thread of a Hindley worm which is simple, positive and economical.

Other objects and features of novelty of my invention will be either specifically pointed out or will become apparent when referring, for a better understanding of my invention, to the following description taken in conjunction with the accompanying drawings, wherein:

Fig. 3 is an end view of the structure illustrated in Fig. 2, as viewed on the line 3—3 thereof, and Fig. 4 is a diagrammatical view of a worm in section showing the changing relation of the grinding wheel and the worm teeth which occur during the machining operation.

Figure 1:
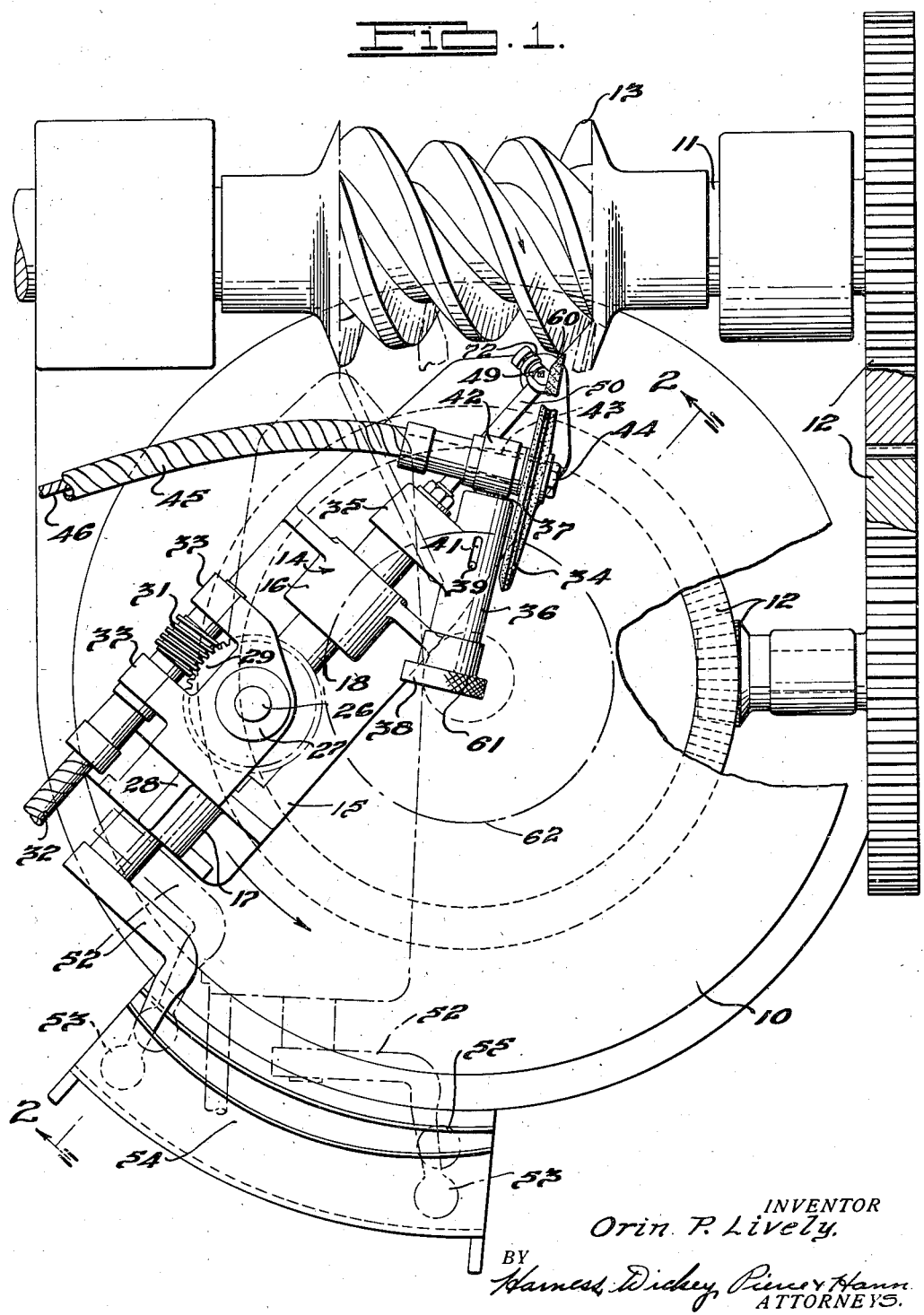
Figure 1 is a plan view, with parts in section and parts broken away, of a grinding device which embodies features of my invention.
Figure 2:
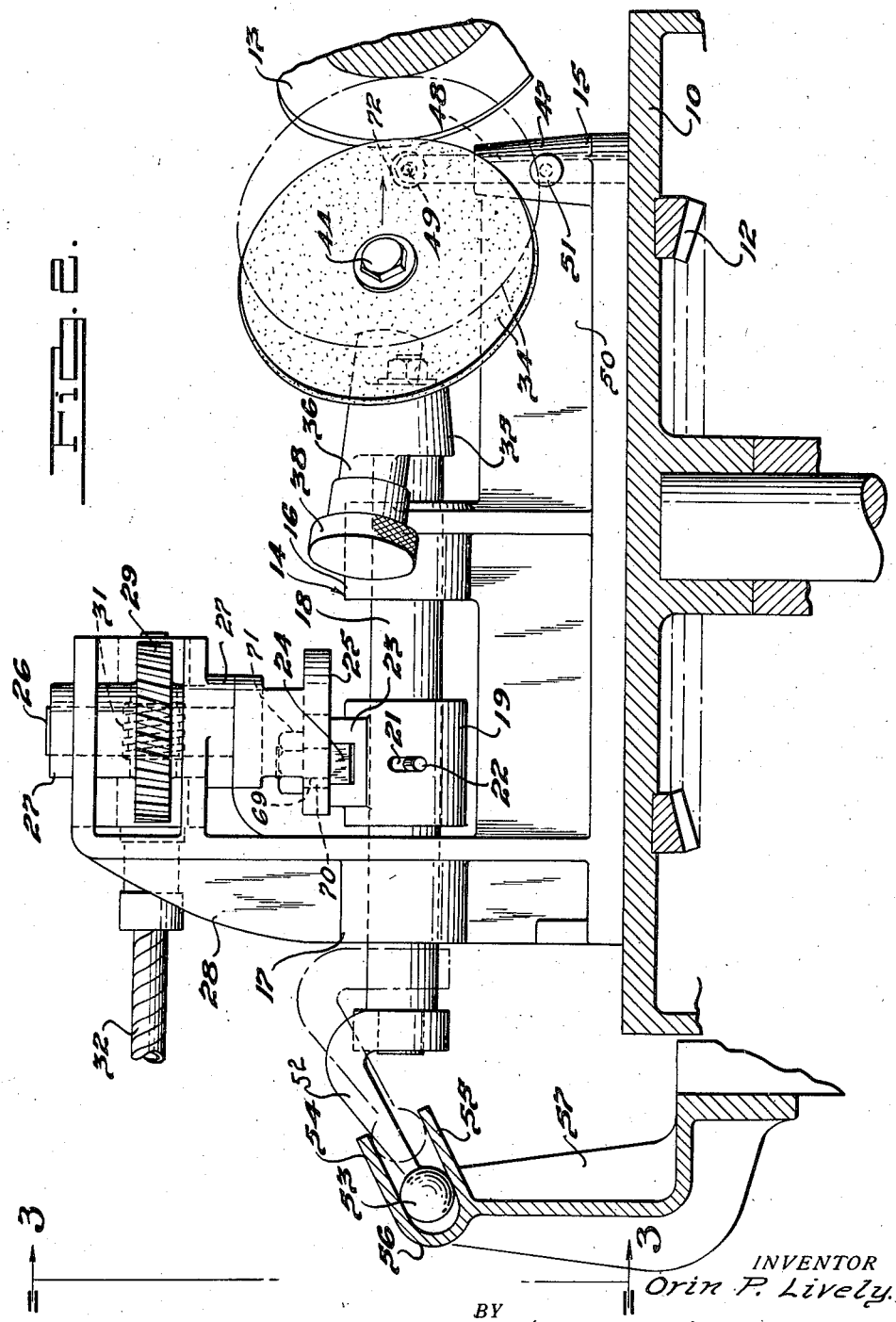
Fig. 2 is a sectional view of the structure illustrated in Figure 1, taken on the line 2—2 thereof.

In Figure 1, I have illustrated a table 10 for supporting the grinding wheel and an arbor 11 for supporting the worm to be ground. The table and arbor are driven in synchronism in timed relation by suitable gearing 12. This driven relation is the same as would occur between a worm and a worm wheel in service. The arbor 11 supports a worm 13 to be ground after it had been machined by the method described in the Cone application above referred to and had been hardened. Upon the table 10 a fixture 14 is mounted embodying a casting 15 having bearings 16 and 17 in which a longitudinally extending rotatable shaft 18 is mounted. A sleeve 19, as illustrated in Fig. 2, is mounted upon shaft 18 between the bearings 16 and 17 and has a slot 21 through which a pin 22, secured in the shaft 18, extends. The sleeve 19 is provided with a guideway 23 in which a slide 24 is positioned, secured to a head 25. The head is provided with a shaft 26 which is journaled in bearings 27 mounted on a bracket 28. A stud 69 is carried by the slide 24 and extends through a slot 70 in the head 25 to which it is clamped by a nut 71. The stud may be shifted in the slot 70 to adjust the extent of the stroke in reciprocation of the shaft 18 produced by the rotation of the head and the operation of the slide 24 in the guideway 23. The shaft 26 has keyed thereto a worm wheel 29. A worm 31 is mounted in mesh with the worm wheel 29 and is driven by the flexible shaft 32, by means not herein illustrated. Through the turning of the shaft 32, the rotation of the shaft 26 is effected, which thereby causes rotation of the head 25 and slide 24, which slide acting in the guideway 23 will cause the longitudinal reciprocation of the shaft 18. Through the operation of the shaft 32, the grinding wheel 34, which is mounted on the end of the shaft 18, is given the desired relatively rapid reciprocating motion across the thread of the worm 13, relative to the thread depth. The end of the shaft 18 is shouldered and has keyed thereto a boss 35 having a bearing 36 angularly disposed thereto. A shaft 37 extends from the bearing 36 and is secured by a thumb nut 38. A pin 39 is secured to the shaft 37 and projects through a slot 41 provided in the bearing 36 to prevent the shaft from turning. The end of the shaft 37 is provided with a bearing 42 through which a shaft 43 extends and on which the grinding wheel 34 is secured to rotate therewith by a nut 44. A flexible casing 45 is connected to the bearing 42 having a chain or other flexible means 46 extending therefrom and connected to the shaft 43 to effect the driving thereof and of the grinding wheel 34.

A boss 47 extends upwardly at the front end of the casting 15 having an aperture therein in which the shank 48 of a diamond dressing tool 49 extends. The boss is joined by a web 50 to the bearing support 16 to provide strength thereto. The dressing tool 49 consists of a screw having a diamond seated in its point and which is threaded into the upper end of the shank 48 as provided with a locking nut 72. The position of the diamond is adjusted by raising or lowering the shank 48 in its aperture and by advancing or retracting the screw 49. The shank 48 and the screw 49 are secured by the screw 51 and the locking nut 72 respectively. By the above means the point of the diamond is adjusted to fall within both the midplane of the worm and the axis of the shaft 18. The dressing of the wheel 34 will be more fully explained hereinafter.

The opposite end of the shaft 18 is provided with an arm 52 having a ball 53 on its projecting end. The ball operates between the flanges 54 and 55 of the cam 56 mounted on a bracket 57 adjacent to the table 10, as illustrated more clearly in Figures 2 and 3. The cam 56 is of such shape, near the web portion that the flanges 54 and 55 produce a tilting of the wheel 34 to compensate for the change in helix of the outer point of the thread due to the changing radial distance because of the "hour glass" shape of the worm. The shape of the flanges 54 and 55 will change outwardly from the web not only because of the change in the helix angle caused by the change in radial distance of the point from the worm axis due to the movement inwardly of the grinding wheel from the edge of the thread but also due to the change which will be produced by the inner movement of the point in the presence of the varying radial distances of the thread because of the "hour glass" shape of the worm. This form can be readily arrived at and produced in the cam and the proper tilting of the grinding wheel 34 will automatically occur while it is passed across the thread as it is reciprocated to contact all of the points throughout the depth of the thread. Because of the variation of the helix at all points of the thread surface, only a very thin grinding surface is preferably employed simulating that of a line and the complete depth of thread is ground in one operation by the rotating wheel 34 when the wheel is rapidly reciprocated in the direction of the forming line or axis of the shaft 18 during its passage from one end of the worm to the other. The reciprocating motion is provided by the worm 31 and wheel 29 as previously explained.

The casting 15 is set in such manner on the table 10 as to have the surface 60 dressed on the stone 34 to fall on a line which is tangent to a "base" circle which is a circle disposed concentric with the center 61 of the table, and is herein illustrated as the circle 62. The Hindley or worm of the hour glass type having straight flanks on its threads is so constructed that a mid-plane through a worm and worm wheel will intersect the teeth of the worm wheel and the thread of the worm in straight lines, all of which when projected are tangent to a concentric circle such as the base circle 62 herein designated.

Referring to Figure 4, I have illustrated the worm 13 in section and distinct positions which the stone will assume when dressing the thread at various positions relative to the axis of the worm. The outer edge of the thread 63 is indicated by the numeral 64 while the root of the thread is indicated by the numeral 65. Positions A, B and C are illustrated in the drawings to show the varying inclination of the grinding wheel at the various grinding points. The position A is that of a portion of the thread in the plane of the worm axis near the left hand edge of the thread as viewed in Figure 4, the position B being that near the center of the worm, while C indicates the tilting relation of the thread at the right hand end thereof as viewed in the figure. The mid-plane or axial line is indicated at 66 in the various views. The full line showing of the wheel indicates its tilted position when grinding near the root 65 of the thread, while the dotted line indicates its position when grinding near the crown 64 or outer end of the thread. The lines 67 indicate the axis of the wheel when the wheel is tilted in a position to grind the root of the thread. The lines 68 indicate the inclination of the axis of the wheel when grinding near the outer edge portion 64 of the thread.

A comparison of the difference in inclination of the disc axis for the positions A, B and C can readily be made from the illustration. Positions A and C show the inclinations for positions near the crown and root of the thread at the left and right hand ends of the worms respectively. The variation of the angularity $d$ and $e$ from the mid-plane when grinding the thread root differing very slightly. The variation between the angles $f$ and $g$ of the axis from the mid-plane line 66 is also slight when grinding the crown of the thread. Position B shows the inclinations at their maximum near the center of the worm. The angularity of the axis relative to the mid-plane when dressing the root of the thread being indicated at $h$ while that when dressing the thread crown is indicated at $i$. These views clearly illustrate the variation in the tilted position of the grinding wheel when grinding from the crown to the root of the thread at various positions in its "hour glass" disposition. These changing angular positions of the wheel occurring as it reciprocates across the worm thread, and as it advances along the worm are accurately produced by the use of the arm 52 operating in the cam 56. The cam surface is accurately formed to produce the desired tilting of the wheel in any of its grinding positions. The reciprocation of the wheel relative to the depth of the thread is rapid while its movement relative to the length of the thread may only occur once.

The machine is universal in that it may be employed on any type of "hour glass" worm of one or a plurality of threads having different pitch and helix angles. The casting 15 may be placed at any distance from the center 61 of the table and at any angle relative to the axis of the worm. It may be adjusted by shims or other means to place the cutting portion of the wheel directly on the central line of the worm thread while the "in-and-out" stroke of the wheel may be effected through the operation of the shaft 32 by a motor, the length of the stroke being preadjusted by means of the pin 69 to rapidly and repeatedly traverse the width of the thread flank during the actuation of the table 10. The dressing of the worm wheel is an incidental operation and is performed when the grinder is purposely advanced beyond the engaging arc of the worm, that is to say, when the arm 52 and ball 53 are clear of the cam 56. During the dressing operation the pin 22 is removed and the shaft 18 is controlled manually by means of the then free arm 52. The dressing consists in reciprocating the shaft 18 while the rotating wheel is fed against the diamond by means of the thumb nut 38. Thus through a very simple dressing operation there is restored to the grinding wheel a new and accurate edge which falls on the thread generating line, or line tangent to the base circle 62.

In operation, the worm 13 is mounted on the arbor 11 adjacent to the wheel 34 which has a face 60 dressed and disposed in a manner set forth above on a line tangent to the base circle 62. The arbor 11 and table 10 are driven in synchronism to pass the wheel 34 across the worm thread as the worm rotates. The wheel 34 is driven through the flexible drive element 46 while it is reciprocated parallel to the tangent line through the operation of the worm 31. The wheel 34 is tilted to extend the grinding action the full depth of the teeth to follow the helix of points of the thread which vary due to the hour glass formation of the worm. The cam for producing the tilting movement is shaped to cause the wheel 34 to grind all points on the proper helix as it advances across the thread when taking into consideration the change in helix due both to the depth of the thread and to its hour glass shape.

While I have illustrated and described but a single embodiment of my invention, it will be apparent to those skilled in the art that various changes, omissions, additions and substitutions may be made therein without departing from the spirit and scope of my invention as set forth in the accompanying claims.

I claim as my invention:

1. A device for grinding worms embodying a support for the worm, means for rotating said worm a table operating in synchronism with the rotation of the worm, a grinding wheel supported by said table having a surface dressed thereon contacting the thread of the worm, means for reciprocating said wheel across the thread of said worm while passing said wheel through the length of said worm, and means for tilting said wheel different amounts as the wheel is reciprocated and passed across the worm both due to its position relative to the depth of the thread and also to its position relative to the length of the worm.

2. A device for grinding worms embodying a support for the worm, means for rotating said worm a table operating in synchronism with the rotation of the worm, a grinding wheel supported by said table having a surface dressed thereon contacting the thread of the worm, means for reciprocating said wheel rapidly relative to the depth of the thread while the wheel is advanced relative to the length of the thread and means for producing a compound tilting of said wheel synchronized with the reciprocation and advancement of said wheel.

3. Apparatus for dressing a worm embodying a support for the worm, a table for supporting a grinding device, said table and support being driven in synchronism, a grinding device having a wheel mounted in position to have a line thereon disposed on a tangent to a circle concentric with the center of the table, means for advancing said wheel along said line, and cam means for tilting said wheel during said advancement in accordance with the change in helix of said thread due to its hour glass disposition, and also in accordance with the changing depth of the machining occurring on the side of the thread.

4. Apparatus for dressing an "hour glass" worm embodying a support for the worm, a table for supporting a grinding device, said table and support being driven in synchronism, a grinding device having an abrading element mounted in position to have a line thereon disposed on a tangent to a circle concentric with the center of the table, means for advancing said element along said line, and means for tilting said element during its passage across the face of the worm while grinding said thread, said means embodying a cam surface so shaped as to provide compound tilting of the element to compensate for the change in helix of the thread surface due both to the depth of thread and its hour glass disposition.

5. A dressing device for worm threads including, in combination, a shaft for supporting a dressing wheel, means for rotating said wheel, means for reciprocating said wheel at an angle to the axis of said shaft, and means for tilting said wheel about a line parallel to the direction of said reciprocation, said means embodying a recessed cam surface, an arm projecting therewithin to be adjusted thereby, and means for driving the worm and table in synchronism to have the cam means and arm adjust the wheel relative to the worm thread as the worm is rotated.

ORIN P. LIVELY.